US012299354B2

(12) United States Patent
Yang et al.

(10) Patent No.: US 12,299,354 B2
(45) Date of Patent: May 13, 2025

(54) MODELING METHOD FOR A FAN ASSEMBLY OF AN AERO ENGINE

(71) Applicant: AECC Commercial Aircraft Engine Co., Ltd., Shanghai (CN)

(72) Inventors: Xiaohe Yang, Shanghai (CN); Xiaomeng Pei, Shanghai (CN); Shiwen Liu, Shanghai (CN)

(73) Assignee: AECC Commercial Aircraft Engine Co., Ltd., Shanghai (CN)

( * ) Notice: Subject to any disclaimer, the term of this patent is extended or adjusted under 35 U.S.C. 154(b) by 901 days.

(21) Appl. No.: 17/416,629

(22) PCT Filed: Jul. 30, 2019

(86) PCT No.: PCT/CN2019/098268
§ 371 (c)(1),
(2) Date: Jun. 21, 2021

(87) PCT Pub. No.: WO2020/134066
PCT Pub. Date: Jul. 2, 2020

(65) Prior Publication Data
US 2022/0058305 A1    Feb. 24, 2022

(30) Foreign Application Priority Data
Dec. 25, 2018  (CN) .......................... 201811586245.1

(51) Int. Cl.
*G06F 30/17*        (2020.01)
*F01D 5/14*         (2006.01)
(Continued)

(52) U.S. Cl.
CPC ............. *G06F 30/17* (2020.01); *F01D 5/141* (2013.01); *F04D 29/384* (2013.01);
(Continued)

(58) Field of Classification Search
CPC ...... G06F 30/17; G06F 2111/10; F01D 5/141; F01D 5/143; F04D 29/384; F04D 29/321;
(Continued)

(56) References Cited

U.S. PATENT DOCUMENTS 6,561,761 B1   5/2003 Decker
2009/0053066 A1   2/2009 Iida
(Continued)

FOREIGN PATENT DOCUMENTS

CN   101149062 A   3/2008
CN   101566169 A   10/2009
(Continued)

OTHER PUBLICATIONS

Supplementary European Search Report for EP19901943, European Patent Office, mailed on Aug. 19, 2022, 11 pages.
(Continued)

*Primary Examiner* — Grant Moubry
*Assistant Examiner* — Ruben Picon-Feliciano
(74) *Attorney, Agent, or Firm* — STERNE, KESSLER, GOLDSTEIN & FOX P.L.L.C.

(57) ABSTRACT

A modeling method for a fan assembly includes-comprises constructing non-axially symmetric end wall curved surfaces in a cascade channel. Constructing the non-axially symmetric end wall curved surfaces in the cascade channel includes: determining, using a flow path design method for a dual flow path of a blade end area, an initial axially symmetric curve radius and a recessed curve lowest point radius of non-axially symmetric curved surfaces; and constructing the non-axially symmetric end wall curved surfaces in the cascade channel according to the initial axially symmetric curve radius and the recessed curve lowest point radius. The modeling method constructs the non-axially symmetric end wall curved surfaces in the cascade channel (Continued)

using the flow path design method for a dual flow path of a blade end area, to implement the control of flow directions by the non-axially symmetric curved surfaces, thereby reducing end wall loss.

6 Claims, 5 Drawing Sheets

(51) Int. Cl.
 *F04D 29/38* (2006.01)
 *G06F 111/10* (2020.01)
(52) U.S. Cl.
 CPC .... *F05D 2220/36* (2013.01); *F05D 2250/712* (2013.01); *F05D 2260/81* (2013.01); *G06F 2111/10* (2020.01)
(58) Field of Classification Search
 CPC ........... F05D 2220/36; F05D 2250/712; F05D 2260/81; F05D 2250/73; B64C 11/02; B64C 11/14
 See application file for complete search history.

(56) References Cited

U.S. PATENT DOCUMENTS

| | | | |
|---|---|---|---|
| 2016/0154901 A1 | 6/2016 | Cellier et al. | |
| 2016/0237837 A1 | 8/2016 | Bennington | |
| 2016/0290645 A1 | 10/2016 | Carr | |
| 2016/0298636 A1 | 10/2016 | Kim et al. | |
| 2017/0023003 A1* | 1/2017 | Lukowski | F04D 29/329 |

FOREIGN PATENT DOCUMENTS

| | | |
|---|---|---|
| CN | 102536329 A | 7/2012 |
| CN | 103244209 A | 8/2013 |
| CN | 104317997 A | 1/2015 |
| CN | 107563074 A | 1/2018 |
| EP | 1995410 A1 | 11/2008 |
| JP | 2001271792 A | 10/2001 |
| JP | 2007247542 A | 9/2007 |
| JP | 2016524260 A | 8/2016 |
| JP | 2017505399 A | 2/2017 |
| RU | 2670380 C2 | 10/2018 |

OTHER PUBLICATIONS

Office Action issued in Japanese Application No. 2021-537167, mailed Jul. 4, 2023, 6 pages.
Liu Bao; "Integrated Blade-Endwall Optimization Design Of Axial Flow Compressor"; Dissertation for the Master Degree in Engineering; School of Energy Science and Engineering, Harbin Institute of Technology; Jul. 2014; 75 pages.
Tang Hui-Min, et al.; "Optimal Design of Profiled Endwall for a Turbine Cascade"; Journal Of Aerospace Power; Research and Development Center, Commercial Aircraft Engine Company Limited, Aviation Industry Corporation of China, Shanghai 200241, China; vol. 30, No. 3, Mar. 2015; 7 pages.
Tang Haibing, et al.; "Review Of Typical Non-Axisymmetric End Wall Profiling Methods"; Journal of Ordnance Equipment Engineering; vol. 39, No. 8, Aug. 2018; 8 pages.
Office Action issued in Russian Application No. 2021121697, mailed Nov. 30, 2022, 6 pages.
Chinese Office Action issued in Chinese Application No. 201811586245.1, mailed Nov. 22, 2021, 18 pages.
Gao Zeng-Xun, et al.; "Aerodynamic Optimal Design of Non-Axisymmetric Endwall for a Turbine Cascade"; Journal of Engineering Thermophysics; Key Laboratory for Thermal Science and Power Engineering of Ministry of Education, Department of Thermal Engineering, Tsinghua University, Beijing, 100084, China; vol. 28, No. 4, Jul. 2007; 3 pages.
International Search Report issued in Chinese Application No. PCT/CN2019/098268, mailed Sep. 17, 2019, 5 pages.

* cited by examiner

MODELING METHOD FOR A FAN ASSEMBLY OF AN AERO ENGINE

CROSS-REFERENCE TO RELATED APPLICATIONS

The present application is based on and claims priority to Chinese patent application No. 201811586245.1 entitled "Modeling method for Fan Assembly" filed on Dec. 25, 2018, the disclosure of which is hereby incorporated in its entirety.

FIELD OF THE DISCLOSURE

The present disclosure relates to the technical field of aero engine design, in particular to a modeling method for a fan assembly.

BACKGROUND OF THE DISCLOSURE

The fan is one of core components of an aero engine, and functions to compress air to increase the total temperature and pressure of gas. A fan assembly includes a hub, a case and blades, wherein the hub partially defines an aerodynamic smooth surface, and the case partially defines the aerodynamic smooth surface. The blades are circumferentially arranged at intervals and positioned around the hub and the case. In general, the blades are uniformly arranged on the hub, and the hub and the case include axially symmetric circumferential surfaces of revolution, and the blades rotate to achieve air compression. A spinner is connected to a front end of the hub, and the spinner guides an airflow into the fan.

Fan efficiency has an important influence on specific fuel consumption of an engine. To reduce specific fuel consumption of the aero engine to improve economy, a bypass ratio of the fan is increased day by day, a pressure ratio of the fan is reduced, a blade tip tangent velocity is reduced, and a hub ratio of the fan (a ratio of a root radius to a tip radius of the fan) is gradually decreased. A hub ratio of a typical civil aero engine has been reduced to less than 0.3. The decrease in the hub ratio reduces a blade root tangent velocity of the fan, and thus, to ensure the root of the fan does work, a camber angle of the fan root is greatly increased. An outlet camber angle of the fan of the typical civil aero engine is skewed (over an axial direction) up to 20°. A large camber angle of the root causes a flow field in an end area close to the hub to become particularly harsh, and leads to serious secondary flow in the case of a conventional axially symmetric end wall, resulting in an increased loss and an increased risk of stall, thus reducing the efficiency and stall margin of the fan. Nowadays, three-dimensional blade modeling technologies such as skew, sweep, and lean are widely used for fans. However, as the stress is largest on the root, which bears complex forces, the application of these technologies at the root of a fan blade is restricted by mechanical problems. End wall modeling achieves good control on the secondary flow of the end area and does not influence the mechanical performance of a rotor. Thus, end wall modeling has become an important measure to control the flow of the end area of the fan. On the other hand, with the spinner connected in front of the fan blades, therefore, in addition to end wall modeling in fan root design, it also needs to consider a combination with spinner modeling.

A typical non-axially symmetric end wall modeling method is a numerical optimization method. The optimization design method is based on the shape of a geometric curved surface of the end wall, parametrically adjusts control points on the curved surface of the end wall, and is nested with a numerical simulation equation, which is solved for optimization. This method can find an optimal end wall curved surface conforming to a flow field from a mathematical point of view, but has a disadvantage that curved surface optimization and solution time is long, and the curved surface generated is often complicated, which is not conducive to engineering applications. Moreover, the existing end wall modeling method only takes into account the shape of the end wall itself, and does not consider the combined design of the end wall and the blades and the spinner, so an air flow is liable to be not smooth, resulting in a reduction in efficiency and a stall margin.

SUMMARY OF THE DISCLOSURE

An object of the present disclosure is providing a modeling method for a fan assembly to reduce end wall loss.

The present disclosure provides a modeling method for a fan assembly, the fan assembly including a hub, a case, and a plurality of blades arranged between the hub and the case, the modeling method including constructing non-axially symmetric end wall curved surfaces in a cascade channel, constructing the non-axially symmetric end wall curved surfaces in the cascade channel including the following steps:

determining, using a flow path design method for a dual flow path of a blade end area, an initial axially symmetric curve radius and a recessed curve lowest point radius of non-axially symmetric curved surfaces; and constructing the non-axially symmetric end wall curved surfaces in the cascade channel according to the initial axially symmetric curve radius and the recessed curve lowest point radius.

In some embodiments, the flow path design method for a dual flow path of a blade end area includes:

determining an initial axially symmetric conventional flow path between a blade leading edge and a blade trailing edge, and determining the initial axially symmetric curve radius according to the initial axially symmetric conventional flow path; and within a distance range of not more than 5% of the root of the blade in an axial position from a root of the blade trailing edge, causing a recessed curve flow path of the non-axially symmetric curved surfaces to coincide with the initial axially symmetric conventional flow path, and determining the recessed curve lowest point radius according to the recessed curve flow path.

In some embodiment, constructing the non-axially symmetric end wall curved surfaces in the cascade channel according to the initial axially symmetric curve radius and the recessed curve lowest point radius includes constructing the non-axially symmetric end wall curved surfaces in the cascade channel by using a multi-segment concave curve modeling method, the multi-segment concave curve modeling method including constructing a multi-segment concave curve by using at least three control points.

In some embodiments, a flowing channel is formed between a pressure surface and a suction surface of two adjacent blades, the multi-segment concave end wall modeling method including:

calculating a circumferential angle of the pressure surface and a circumferential angle of the suction surface of the blades at a same axial position;

constructing a first curve segment, a second curve segment, and a third curve segment respectively in three angle sub-intervals within an angle range from the suction surface to the pressure surface, wherein two end radii of the first curve segment are respectively an initial axially symmetric curve radius and a recessed curve lowest point radius; the second curve segment is an equal radius zone, and a radius thereof is a recessed curve lowest point radius; and two end radii of the third curve segment are respectively a recessed curve lowest point radius and an initial axially symmetric curve radius; and constructing the first curve segment, the second curve segment, and the third curve segment respectively by using angle radius control formulas.

In some embodiments, the angle radius control formula for constructing the first curve segment is:

$$r = A_p \theta^2 + B_p \theta + C_p$$

$$r_A = A_p \theta_p^2 + B_p \theta_p C_p$$

$$r_C = A_p (\theta_p + \theta_1)^2 + B_p (\theta_p + \theta_1) + C_p$$

the angle radius control formula for constructing the second curve segment is: $r = r_C$; and the angle radius control formula for constructing the third curve segment is:

$$r = A_s \theta^2 + B_s \theta + C$$

$$r_A = A_s \theta_s^2 + B_s \theta_s + C$$

$$r_C = A_s (\theta_s + \theta_3)^2 + B_s (\theta_s + \theta_3) + C_s$$

wherein Ap, Bp, Cp, As, Bs, and Cs are set values.

In some embodiments, concave curves are constructed at a plurality of axial positions, and the concave curves at the axial positions are connected to form the non-axially symmetric end wall curved surfaces in the cascade channel.

In some embodiments, the fan assembly further includes a spinner, and the modeling method further includes constructing a spinner diversion cone curved surface after constructing the non-axially symmetric end wall curved surfaces in the cascade channel.

In some embodiments, constructing the spinner diversion cone curved surface includes:

calculating a circumferential position of a leading edge point of each non-axially symmetric end wall curved surface in the cascade channel;

in an axial direction, extending forward from the leading edge point to a connecting point with the spinner diversion cone curved surface, gradually reducing a radius difference between the non-axially symmetric end wall curved surface and a spinner meridian flow surface to zero at the connecting point, and calculating a circumferential position of the leading edge point by using a velocity triangle formula; and determining a transition between the non-axially symmetric end wall curved surface and an axially symmetric initial spinner curved surface to obtain the spinner diversion cone curved surface.

In some embodiments, the modeling method further includes connecting each non-axially symmetric end wall curved surface in the cascade channel, the spinner diversion cone curved surface, and the blades to form an integrated curved surface.

In some embodiments, after the integrated curved surface is obtained, numerical simulation analysis is performed in order to make the judgement that whether the flow field is healthy.

Based on the technical solution provided by the present disclosure, the modeling method includes constructing non-axially symmetric end wall curved surfaces in a cascade channel. Constructing the non-axially symmetric end wall curved surfaces in the cascade channel includes the following steps: determining, using a flow path design method for a dual flow path of a blade end area, an initial axially symmetric curve radius and a recessed curve lowest point radius of non-axially symmetric curved surfaces; and constructing the non-axially symmetric end wall curved surfaces in the cascade channel according to the initial axially symmetric curve radius and the recessed curve lowest point radius. The modeling method of the present disclosure constructs the non-axially symmetric end wall curved surfaces in the cascade channel using the flow path design method for a dual flow path of a blade end area, to implement the control of flow directions by the non-axially symmetric curved surfaces, thereby reducing end wall loss.

Other features and advantages of the present disclosure will become apparent from the following detailed description of exemplary embodiments of the present disclosure with reference to the accompanying drawings.

BRIEF DESCRIPTION OF THE DRAWINGS

Drawings described here are used to provide a further understanding of the present disclosure and form a part of the present application. Illustrative embodiments of the present disclosure and description thereof are used for explaining rather than unduly limiting the present disclosure. In the drawings.

DETAILED DESCRIPTION OF THE EMBODIMENTS

Technical solutions in the embodiments will be described below clearly and completely in conjunction with the accompanying drawings in the embodiments of the present disclosure. Obviously, the described embodiments are only part of, instead of all of embodiments of the present disclosure. The following description of at least one exemplary embodiment is actually only illustrative, and in no way serves as any limitation to the present disclosure and its application or use. Based on the embodiments of the present disclosure, all other embodiments obtained by a person of ordinary skill in the art without creative work should fall into the protection scope of the present disclosure.

Unless specifically stated otherwise, the relative arrangement of components and steps, numerical expressions and numerical values set forth in these embodiments do not limit the scope of the present disclosure. Furthermore, it should be understood that, for ease of description, the sizes of various parts shown in the drawings are not drawn in accordance with actual proportional relationships. Technologies, methods, and devices known to those of ordinary skill in the related art may be not discussed in detail, but where appropriate, the technologies, methods, and device should be regarded as part of the specification as granted. In all examples shown and discussed here, any specific value should be interpreted as merely exemplary, rather than as a limitation. Therefore, other examples of an exemplary embodiment may have different values. It should be noted that similar reference numerals and letters denote similar items in the following drawings, so once a certain item is defined in one drawing, it does not need to be further discussed in subsequent drawings.

For ease of description, spatially relative terms such as "above . . . ", "over . . . ", "on an upper surface of . . . " and "upper" can be used here to describe spatial positional relationship between one device or feature and other devices or features as shown in the figures. It should be understood that a spatially relative term is intended to encompass different orientations in use or operation other than the orientation of a device described in a figure. For example, if the device in the figure is inverted, then the device described as "above other devices or structures" or "over other devices or structures" will be positioned "below other devices or structures" or "under other devices or structures". Thus, the exemplary term "above . . . " may include both orientations of "above . . . " and "below . . . ". The device may also be positioned in other different ways (rotated by 90 degrees or in other orientations), and the relative spatial description used here is explained accordingly.

Figure 1:
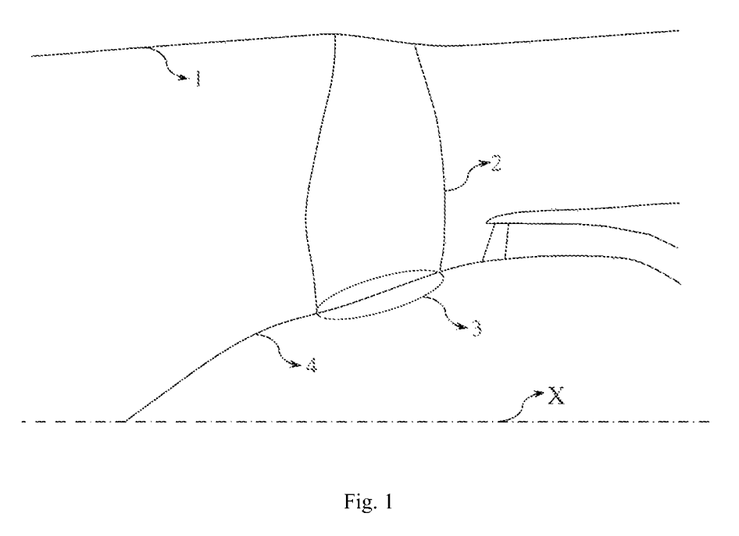
FIG. 1 is a structural diagram of a fan assembly.

FIG. 1 shows a structural diagram of a fan assembly. The fan assembly includes a case 1, blades 2, a hub 3 and a spinner 4. The spinner 4 and the hub 3 are butted to form a smooth flow path. The case 1, the spinner 4 and the hub 3 limits a flow boundary of an airflow. The blades 2, the hub 3 and the spinner 4 rotate together about an axis X, and the blades 2 compress an incoming flow.

A modeling method for a fan assembly of an embodiment of the present disclosure includes constructing non-axially symmetric end wall curved surfaces in a cascade channel. Constructing the non-axially symmetric end wall curved surfaces in the cascade channel includes the following steps:
determining, using a flow path design method for a dual flow path of a blade end area, an initial axially symmetric curve radius and a recessed curve lowest point radius of non-axially symmetric curved surfaces; and
constructing the non-axially symmetric end wall curved surfaces in the cascade channel according to the initial axially symmetric curve radius and the recessed curve lowest point radius.

The modeling method of the embodiment of the present disclosure constructs the non-axially symmetric end wall curved surfaces in the cascade channel using a flow path design method for a dual flow path of a blade end area, to implement the control of flow directions by the non-axially symmetric curved surfaces, thereby reducing end wall loss.

Figures 3, 4:
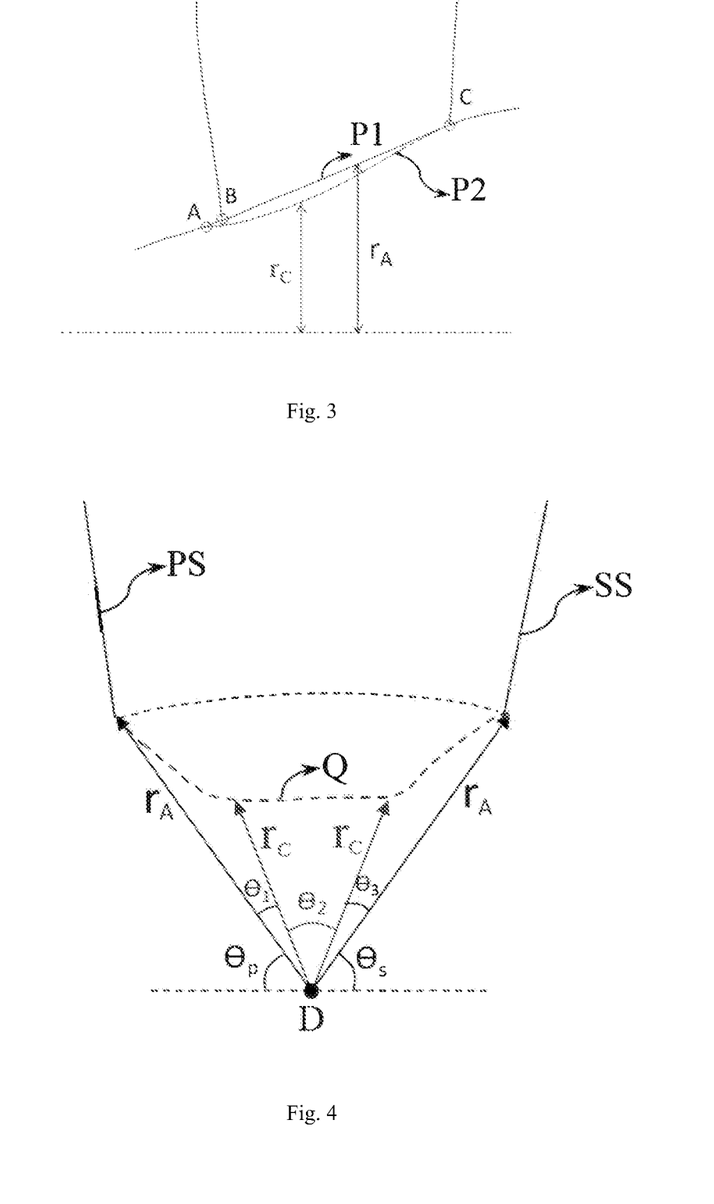
FIG. 3 is a principle diagram of a dual flow path design method in a modeling method of an embodiment of the present disclosure.
FIG. 4 is a schematic diagram of constructing a three-segment concave curve in a modeling method of an embodiment of the present disclosure.

Specifically, as shown in FIG. 3, the flow path design method for a dual flow path of a blade end area of this embodiment includes:
determining an initial axially symmetric conventional flow path P1 between a blade leading edge B and a blade trailing edge C, and determining the initial axially symmetric curve radius $r_A$, that is, the distance from any point on the initial axially symmetric conventional flow path P1 to the axis X, according to the initial axially symmetric conventional flow path P1; and
within a distance range of not more than 5% of the root of the blade in an axial position from the root of blade trailing edge C, causing a recessed curve flow path P2 of the non-axially symmetric curved surfaces to coincide with the initial axially symmetric conventional flow path P1 to obtain a recessed curve flow path, and determining the recessed curve lowest point radius according to the recessed curve flow path.

Specifically, in this embodiment, as shown in FIG. 3, the initial axially symmetric conventional flow path P1 coincides with the recessed curve flow path P2 at a point C in this embodiment.

Figure 5:
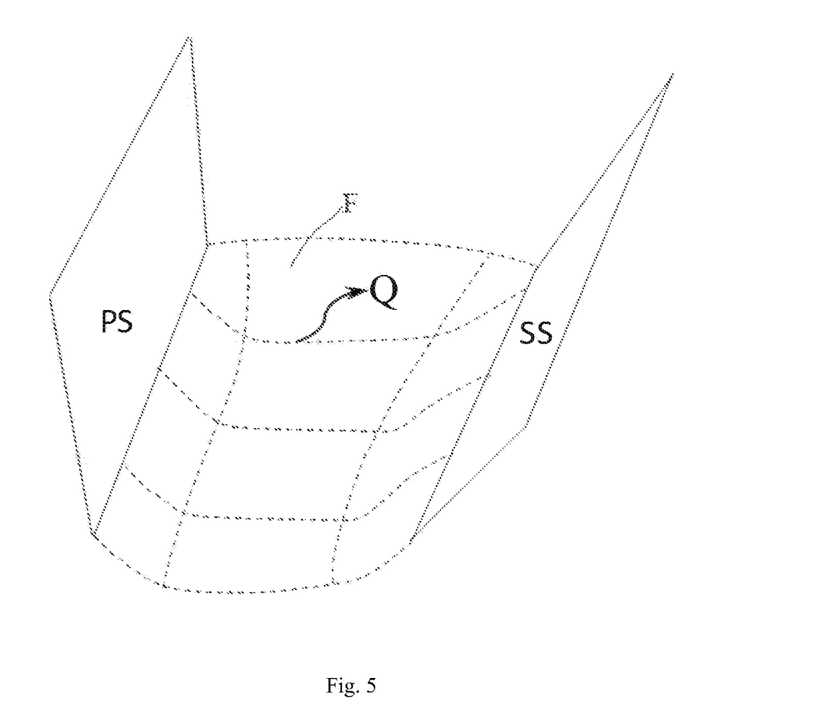
FIG. 5 is a structural diagram of a concave curved surface in an embodiment of the present disclosure.

In this embodiment, as shown in FIGS. 4 and 5, constructing the non-axially symmetric end wall curved surfaces in the cascade channel according to the initial axially symmetric curve radius $r_A$ and the recessed curve lowest point radius $r_C$ includes constructing the non-axially symmetric end wall curved surfaces in the cascade channel by using a multi-segment concave curve modeling method, the multi-segment concave curve modeling method including constructing a multi-segment concave curve by using at least three control points. Constructing the non-axially symmetric end wall curved surfaces in the cascade channel by using the above-mentioned multi-segment concave curve modeling method can achieve parametric shaping of a recessed curved surface, which is convenient for a designer to adjust the shape of the non-axially symmetric curved surfaces in the cascade channel and implement integrated shaping of the blade root and the recessed curved surface. Moreover, the above-mentioned method is easy to apply and implement in engineering.

Specifically, as shown in FIGS. 4 and 5, a flowing channel is formed between a pressure surface PS and a suction surface SS of two adjacent blades, the multi-segment concave end wall modeling method including:
calculating a circumferential angle $\theta_p$ of the pressure surface PS and a circumferential angle $\theta_s$ of the suction surface SS of the blades at a same axial position D;
constructing a first curve segment, a second curve segment, and a third curve segment respectively in three angle sub-intervals within an angle range from the pressure surface PS to the suction surface SS, and connecting the first curve segment, the second curve segment and the third curve segment successively to form a concave curve Q, wherein two end radii of the first curve segment are respectively an initial axially symmetric curve radius $r_A$ and a recessed curve lowest point radius $r_C$; the second curve segment is an equal radius zone, and a radius thereof is a recessed curve lowest point radius $r_C$; and two end radii of the third curve segment are respectively a recessed curve lowest point radius $r_C$ and an initial axially symmetric curve radius $r_A$; and
constructing the first curve segment, the second curve segment, and the third curve segment respectively by using an angle and radius formula.

Figure 6:
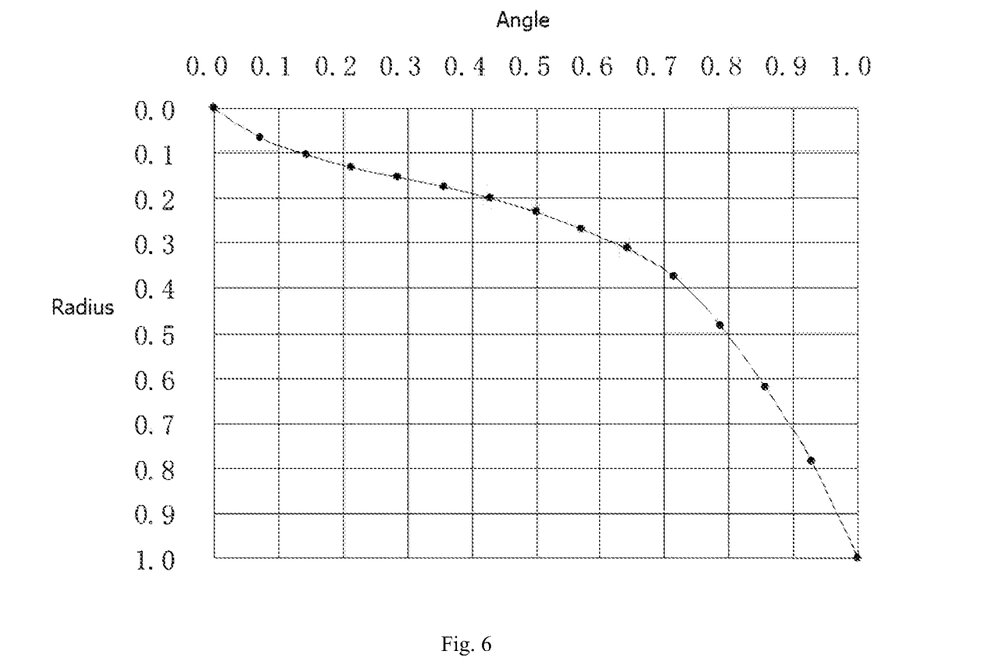
FIG. 6 is a schematic diagram of an angle-radius transition rule.

Specifically, the angle and radius formula for the first curve segment in this embodiment is:

$$r = A_p \theta^2 + B_p \theta + C_p$$

$$r_A = A_p \theta_p^2 + B_p \theta_p + C_p$$

$$r_C = A_p (\theta_p + \theta_1)^2 + B_p (\theta_p + \theta_1) + C_p$$

the angle and radius formula for the second curve segment is:

$r = r_C$ the angle and radius formula for the third curve segment is:

$r = A_s \theta^2 + B_s \theta + C$ $r_A = A_s \theta_s^2 + B_s \theta_s + C$ $r_C = A_s (\theta_s + \theta_3)^2 + B_s (\theta_s + \theta_3) + C_s$ wherein Ap, Bp, Cp, As, Bs, and Cs are determined by an angle-radius transition rule given and adjusted by the designer, and a typical angle-radius transition rule is shown in FIG. 6.

In other embodiments, the control points can be increased or decreased as needed, but at least three control points are required. As the same dimensionless transition rule is used along the chordwise section, it can ensure smoothness of the chordwise transition, thereby ensuring the smoothness of the curved surface.

As shown in FIG. 5, concave curves Q are constructed at a plurality of axial positions, and the concave curves Q at the axial positions are connected to form concave end wall curved surfaces, that is, the non-axially symmetric end wall curved surfaces F in the cascade channel.

As shown in FIG. 1, the fan assembly of this embodiment further includes a spinner 4. The modeling method further includes constructing a spinner diversion cone curved surface after constructing the non-axially symmetric end wall curved surfaces in the cascade channel.

Figure 7:
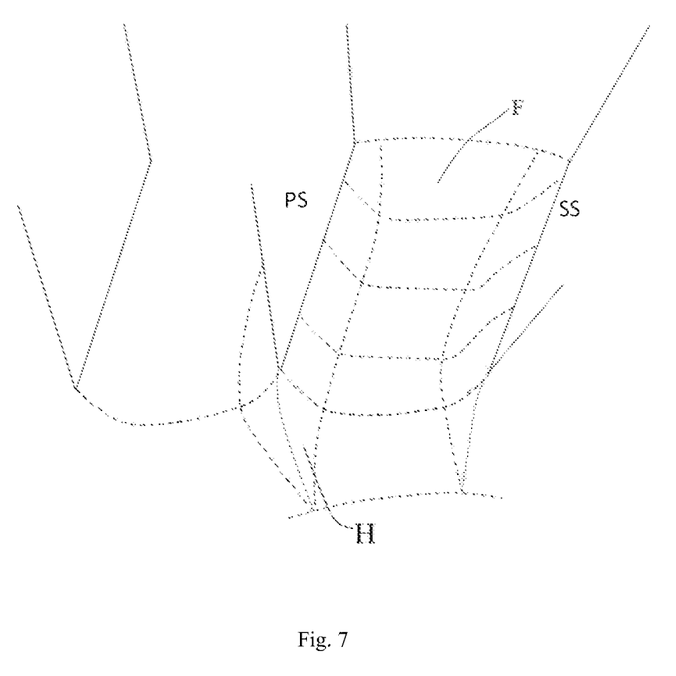
FIG. 7 is an integrated shaping diagram of a spinner diversion cone and a concave curved surface in an embodiment of the present disclosure.

As shown in FIG. 7, constructing the spinner diversion cone curved surface in this embodiment includes:
calculating a circumferential position of a leading edge point B of the non-axially symmetric end wall curved surfaces in the cascade channel $\theta_B$;
in an axial direction, extending forward from the leading edge point B to a connecting point A with the spinner diversion cone curved surface, gradually reducing a radius difference between the non-axially symmetric end wall curved surface and a spinner meridian flow surface to zero at the connecting point A, and calculating a circumferential position $\theta_A$ of the connecting point A by using a velocity triangle formula, and rotating an angle $\Delta\theta$ along a relative flow direction of fluid based on the circumferential position $\theta_B$ of the point B;

$\theta_A = \theta_B + \Delta_\theta$

After determining the circumferential positions of the connecting point A and the leading edge point B, setting control points along the axial direction to control circumferential angle variations of the diversion cone, so that the diversion cone gradually extends forward from a leading edge of the fan root to a point of intersection along a metal angle direction of the leading edge; and similarly, determining a transition between the non-axially symmetric end wall curved surface and an axially symmetric initial spinner curved surface to obtain the spinner diversion cone curved surface H. In this embodiment, the spinner diversion cone curved surface H is constructed so that the spinner and a recessed curve end wall are smoothly butted, thereby guiding the airflow to the end wall.

After constructing each non-axially symmetric end wall curved surface F in the cascade channel and the spinner diversion cone curved surface H described above, the modeling method of this embodiment further includes connecting each non-axially symmetric end wall curved surface F in the cascade channel, the spinner diversion cone curved surface H, and the blades to form an integrated curved surface. In this embodiment, the end wall, the blade end area, and the spinner are integrally shaped to achieve a curve shaping design in which the non-axially symmetric end wall in the cascade channel and the blades and the spinner are integrated, and further improve the flow smoothness of the airflow, thereby improving the efficiency and stall margin.

Figure 2:
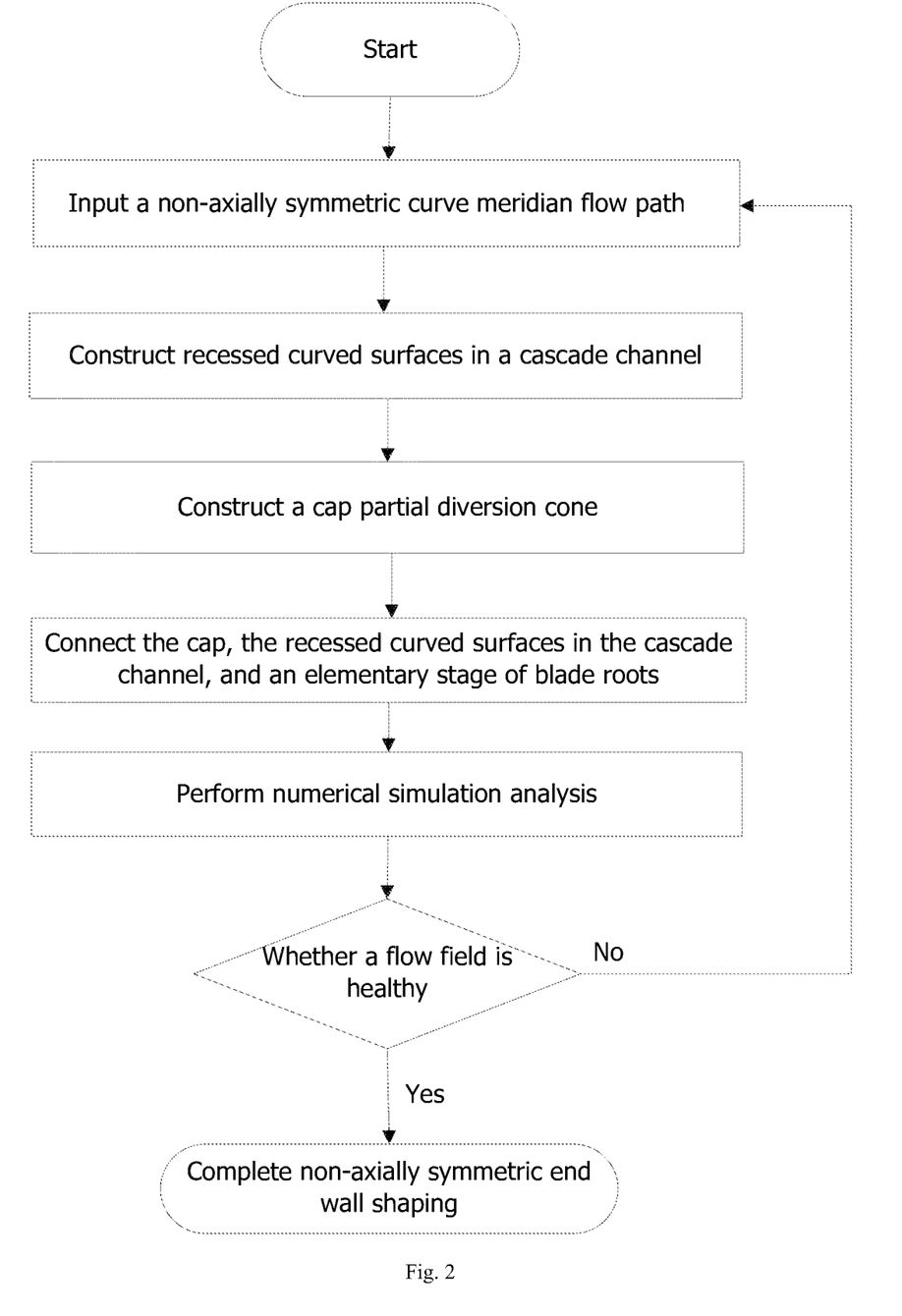
FIG. 2 is a schematic diagram of steps of a modeling method for a fan assembly in an embodiment of the present disclosure.

As shown in FIG. 2, after the integrated curved surface is obtained, numerical simulation analysis is performed in order to make the judgement that whether the flow field is healthy. If the flow field is healthy, the above-mentioned curves are constructed; and if the flow field is not healthy, the shape of the curved surfaces is adjusted by using the method of the above steps again until the goal of a healthy flow field is reached.

Finally, it should be noted that the above embodiments are only used for describing rather than limiting the technical solutions of the present disclosure. Although the present disclosure is described in detail with reference to the preferred embodiments, those of ordinary skill in the art should understand that they still can make modifications to the specific implementations in the present disclosure or make equivalent substitutions to part of technical features thereof; and such modifications and equivalent substitutions should be encompassed within the technical solutions sought for protection in the present disclosure so long as they do not depart from the principle of the technical solutions of the present disclosure.

The invention claimed is:

1. A modeling method for a fan assembly of an aero engine, the fan assembly comprising a hub, a case, and a plurality of blades arranged between the hub and the case, wherein the modeling method comprises constructing non-axially symmetric end wall curved surfaces of the hub in a cascade channel, the constructing the non-axially symmetric end wall curved surfaces of the hub in the cascade channel comprising the following steps:
determining, using a flow path design method for a dual flow path of a blade end area, an initial axially symmetric curve radius and a recessed curve lowest point radius of non-axially symmetric curved surfaces, wherein the flow path design method comprises:
determining an initial axially symmetric conventional flow path between a blade leading edge and a blade trailing edge, and determining the initial axially symmetric curve radius according to the initial axially symmetric conventional flow path; and
within a distance range of not more than 5% of a root of the blade in an axial position from a root of the blade trailing edge, causing a recessed curve flow path of the non-axially symmetric curved surfaces to coincide with the initial axially symmetric conventional flow path, and determining the recessed curve lowest point radius according to the recessed curve flow path; and
constructing the non-axially symmetric end wall curved surfaces of the hub in the cascade channel according to the initial axially symmetric curve radius and the recessed curve lowest point radius by using a multi-segment concave curve modeling method, the multi-segment concave curve modeling method comprising constructing a multi-segment concave curve by using at least three control points, a flowing channel is formed between a pressure surface and a suction surface of two adjacent blades, the multi-segment concave curve modeling method comprising:

calculating a circumferential angle of the pressure surface and a circumferential angle of the suction surface of the blades at a same axial position;

constructing a first curve segment, a second curve segment, and a third curve segment respectively in three angle sub-intervals within an angle range from the suction surface to the pressure surface, wherein two end radii of the first curve segment are respectively the initial axially symmetric curve radius and the recessed curve lowest point radius; the second curve segment is an equal radius zone, and a radius thereof is the recessed curve lowest point radius; and two end radii of the third curve segment are respectively the recessed curve lowest point radius and the initial axially symmetric curve radius; and constructing the first curve segment, the second curve segment, and the third curve segment respectively by using an angle and radius formula, wherein the angle and radius formula for constructing the first curve segment is:

$r = A_p \theta^2 + B_p \theta + C_p$ $r_A = A_p \theta_p^2 + B_p \theta_p + C_p$ $r_C = A_p(\theta_p + \theta_1)^2 + B_p(\theta_p + \theta_1) + C_p$ wherein r is the radius of the control point of the first curve segment, $\theta$ is the circumferential angle of the control point of the first curve segment, $r_A$ is an initial axially symmetric curve radius, $r_C$ is a recessed curve lowest point radius of non-axially symmetric curved surfaces, $\theta_p$ is the circumferential angle of the blade pressure surface, $\theta_1$ is the circumferential angle difference between the two endpoints of the first curve segment, and $A_p$, $B_p$, and $C_p$ are set values, wherein the angle and radius formula for constructing the second curve segment is: $r = r_C$, wherein r is the radius of the control point of the second curve segment, and $r_C$ is a recessed curve lowest point radius of non-axially symmetric curved surfaces, and wherein the angle and radius formula for constructing the third curve segment is:

$r = A_s \theta^2 + B_s \theta + C_p$ $r_A = A_s \theta_s^2 + B_s \theta_s + C$ $r_C = A_s(\theta_s + \theta_3)^2 + B_s(\theta_s + \theta_3) + C_s$ wherein r is the radius of the control point of the third curve segment, $\theta$ is the circumferential angle of the control point of the third curve segment, $r_A$ is an initial axially symmetric curve radius, $r_c$ is a recessed curve lowest point radius of non-axially symmetric curved surfaces, $\theta_s$ is the circumferential angle of the blade suction surface, $\theta_3$ is the circumferential angle difference between the two endpoints of the third curve segment, and $A_s$, $B_s$, and $C_s$ are set values.

2. The modeling method for a fan assembly of an aero engine according to claim 1, wherein concave curves are constructed at a plurality of axial positions, and the concave curves at the axial positions are connected to form the non-axially symmetric end wall curved surfaces of the hub in the cascade channel.

3. The modeling method for a fan assembly of an aero engine according to claim 1, wherein the fan assembly further comprises a spinner, and the modeling method further comprises constructing a spinner diversion cone curved surface after constructing the non-axially symmetric end wall curved surfaces of the hub in the cascade channel.

4. The modeling method for a fan assembly of an aero engine according to claim 3, wherein constructing the spinner diversion cone curved surface comprises:

calculating a circumferential position of a leading edge point of the non-axially symmetric end wall curved surface of the hub in the cascade channel;

in an axial direction, extending forward from the leading edge point to a connecting point of the non-axially symmetric end wall curved surface of the hub in the cascade channel with the spinner diversion cone curved surface, gradually reducing a radius difference between the non-axially symmetric end wall curved surface and a spinner meridian flow surface to zero at the connecting point, and calculating a circumferential position of the connecting point by using a velocity triangle formula; and determining, by using the multi-segment concave curve shaping method, a transition between the non-axially symmetric end wall curved surface of the hub and an axially symmetric initial spinner curved surface to obtain the spinner diversion cone curved surface.

5. The modeling method for a fan assembly of an aero engine according to claim 4, further comprises connecting the non-axially symmetric end wall curved surface in the cascade channel, the spinner diversion cone curved surface, and the blades to form an integrated curved surface.

6. The modeling method for a fan assembly of an aero engine according to claim 5, wherein after the integrated curved surface is obtained, numerical simulation analysis is performed in order to make the judgement that whether the flow field is healthy.

* * * * *